United States Patent [19]
Van Rooij

[11] Patent Number: 5,555,031
[45] Date of Patent: Sep. 10, 1996

[54] ADAPTIVE VIDEO SIGNAL COMPRESSION

[75] Inventor: Johannes H. J. M. Van Rooij, 's-Hertogenbosch, Netherlands

[73] Assignee: U.S. Philips Corporation, New York, N.Y.

[21] Appl. No.: 317,145

[22] Filed: Oct. 3, 1994

[30] Foreign Application Priority Data

Oct. 1, 1993 [BE] Belgium ............................... 09301030

[51] Int. Cl.$^6$ ......................................................... H04N 5/68
[52] U.S. Cl. ............................ 348/645; 348/652; 348/713
[58] Field of Search ...................... 348/645, 652, 348/521, 713, 712; H04N 5/68

[56] References Cited

U.S. PATENT DOCUMENTS

| | | | |
|---|---|---|---|
| 4,499,486 | 2/1985 | Favreau et al. ............................ | 358/37 |
| 4,712,132 | 12/1987 | Soca ............................................ | 348/645 |
| 4,757,373 | 7/1988 | Van Rooy .................................... | 358/37 |
| 4,812,902 | 3/1989 | Fuchsberger ............................ | 348/645 |
| 4,831,434 | 5/1989 | Fuchsberger ............................... | 358/80 |
| 5,124,785 | 6/1982 | Hirose et al. .............................. | 358/27 |

FOREIGN PATENT DOCUMENTS

| | | | |
|---|---|---|---|
| 0067083 | 12/1982 | European Pat. Off. . | |
| 3629403 | 3/1988 | Germany . | |
| 4203092 | 5/1993 | Germany ......................... | H04N 9/68 |
| 201697 | 3/1991 | Japan ................................ | H04N 9/68 |
| 2198008 | 6/1988 | United Kingdom . | |

*Primary Examiner*—Safet Metjahic
*Assistant Examiner*—Glenton B. Burgess
*Attorney, Agent, or Firm*—Edward W. Goodman

[57] ABSTRACT

In a video signal processing circuit, an adaptive signal compression is realized by correcting the color saturation by multiplication of color difference signals (R-Y, G-Y) by a same correction factor in such a way that color signal values (R, G, B) remain below their respective maximally allowed values without the luminance (Y) being limited as well. Preferably, the correction factor is obtained in dependence upon a non-linearly compressed luminance signal (Y').

14 Claims, 2 Drawing Sheets

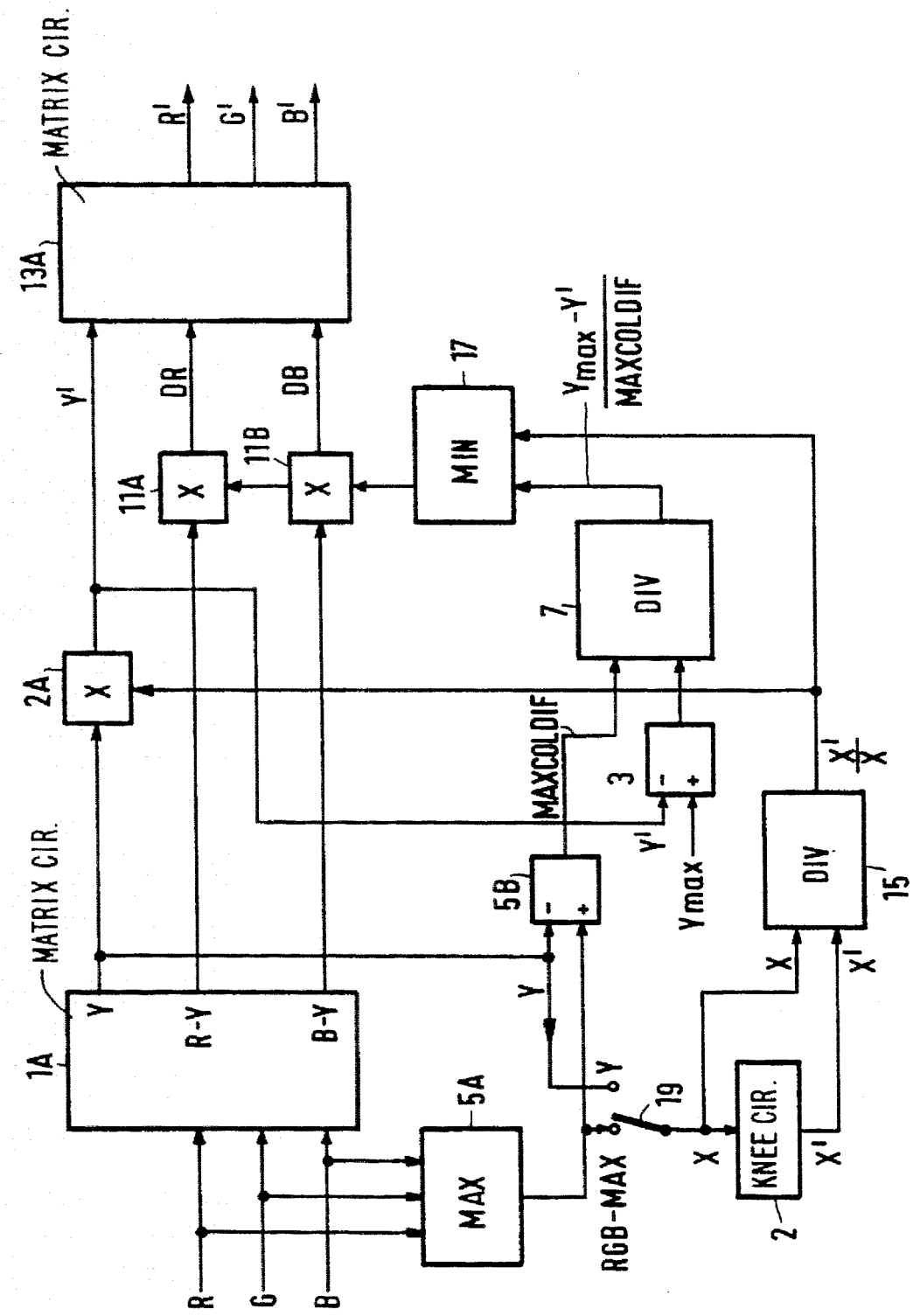

ADAPTIVE VIDEO SIGNAL COMPRESSION

BACKGROUND OF THE INVENTION

1. Field of the Invention

The invention relates to a method and apparatus for realizing an adaptive signal compression. The invention also relates to a camera including such an adaptive video signal compression circuit.

2. Description of the Related Art

In current television cameras, the three color signals red (R), green (G) and blue (B) are limited at a range between the minimally (0%) and the maximally (100%) allowed color signal values before encoding to luminance (Y) and color difference signals (R-Y, B-Y). The cameraman controls the aperture of his camera and hence the color signal values in R, G, B, dependent on the value of the luminance signal Y. Since luminance Y=0.30.R+0.59.G+0.11.B, there are colors for which a color signal value R, G, B will exceed its respective maximally allowed value, whereas the luminance signal value Y is still smaller than the maximally allowed luminance signal value Ymax. Current cameras include circuits, referred to as white limiters, which limit a color signal value exceeding the maximally allowed color signal value to the maximally allowed value, see FIG. 1 of EP-A-0,425,813 corresponding to U.S. Pat. No. 5,124,785, with compressing amplifiers, compression circuits and limiters which are operative per color signal. Since these white limiters affect only that color signal which exceeds its maximally allowed value, there will be color degeneration which has hitherto been taken for granted. Particularly for skin tones, this color degeneration is quite evident, with the color tending towards yellow when the control range is exceeded. Color degeneration also occurs in the other circuits shown in U.S. Pat. No. 5,124,785, in which color signals are still processed by the compressing amplifiers and compression circuits which are operative per color signal and in which subsequently obtained color difference signals are limited to their respective maximally allowed values by limiters which are operative per color difference signal.

To visualize color signals exceeding the normal control range, the color signal in cameras is often compressed above a given point referred to as the "knee point" which is typically at 60–80% of the maximum value. An adaptive signal compression circuit is described in EP-B-0,223,295, corresponding to U.S. Pat. No. 4,757,373 (PHN 11.559). Here, too, color degeneration occurs, see SMPTE Journal, March 1992, pp. 135–139. To prevent the color degeneration from occurring in such circuits, EP-B-0,192,497 corresponding to U.S. Pat. No. 4,712,132, shows a circuit which preserves the mutual ratio of R, G and B and hence color saturation and tint by multiplication of the three color signals. In this circuit, however, the maximum control range in the luminance signal after the compression has become color-dependent and limited. In theory, for example, a saturated blue signal compressed by means of this method will yield a luminance signal which will never reach more than 11% of the maximum amplitude, so that it does not give the viewer the impression of much light.

SUMMARY OF THE INVENTION

It is, inter alia, an object of the invention to provide an adaptive video signal compression circuit and a camera in which the afore-mentioned color degeneration is limited. To this end a first aspect of the invention provides a video signal processing circuit for realizing an adaptive signal compression, comprising first means for supplying color difference signals; and color saturation control means coupled to said first means for limiting at least one color signal exceeding its respective maximum value by multiplying the color difference signals by a same correction factor, wherein the color saturation control means comprises means for obtaining a maximum value of three color difference signals; means for determining a difference between a maximally allowed luminance signal value and a luminance signal; and means for obtaining the correction factor in dependence on the difference between the maximally allowed luminance signal value and the luminance signal, and the maximum value of the three color difference signals.

The first aspect of the invention is based on the recognition that variations in color saturation are less conspicuous and subjectively give a more natural impression than variations in color signals due to operation of the white limiters in the color signal path. For this reason, the invention does not affect the luminance and the tint, but corrects the color saturation by multiplication of the color difference signals by one and the same correction factor in such a way that the color signal values remain below their respective maximally allowed values. This yields the advantage that unnatural discolorations caused by white limiters no longer occur and the original tint is maintained. The correction factor preferably depends on the difference between a maximally allowed luminance signal value and the luminance signal (hence, on the control range in the luminance signal) and on the maximum value of the three color difference signals.

It is a further object of the invention to provide an adaptive non-linear signal compression circuit which can yield a large luminance signal without color degeneration. To this end, a second aspect of the invention provides a video signal processing circuit as described above, which is further provided with a non-linear compression circuit for compressing the luminance signal and for applying a compressed luminance signal to the difference determining means.

The second aspect of the invention is based on the recognition that an adaptive non-linear signal compression circuit which can still yield a large luminance signal without color degeneration can be obtained by reducing the color saturation in a controlled manner. This can be realized in a very simple manner by incorporating an adaptive or non-adaptive knee circuit, which is known or not known per se, in the luminance signal path of a video signal processing circuit in accordance with the first aspect of the invention.

These and other aspects of the invention will be apparent from and elucidated with reference to the embodiments described hereinafter.

BRIEF DESCRIPTION OF THE DRAWINGS

In the drawings:

FIG. 3 shows a third embodiment of a video signal processing circuit according to the invention.

DESCRIPTION OF THE PREFERRED EMBODIMENTS

Figure 1:
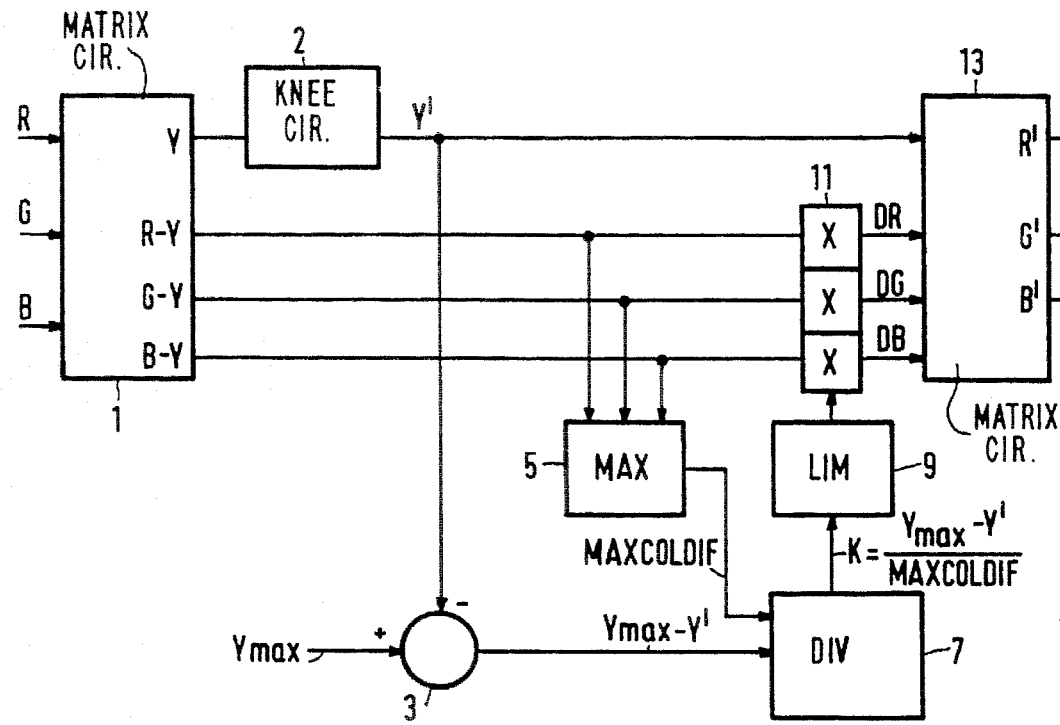
FIG. 1 shows a first embodiment of a video signal processing circuit according to the invention.

In the video signal processing circuit shown in FIG. 1, three color signals R, G, B are applied to a matrix circuit 1 which generates a luminance signal Y and three color difference signals R-Y, G-Y, B-Y from these color signals. The luminance signal Y is applied, via a knee circuit 2 which may be absent and which will be further described hereinafter, to a subtracter circuit 3 to which also the maximally allowed luminance signal value Ymax is applied for determining the difference Ymax-Y (or Ymax-Y' in the presence of the knee circuit 2). The difference Ymax-Y provides the control range still available up to Ymax. The three color difference signals R-Y, G-Y, B-Y are applied to a maximum circuit 5 which determines the maximum MAXCOLDIF of these color difference signals. The signals Ymax-Y and MAXCOLDIF are applied to a divider 7 for determining the quotient K=(Ymax-Y)/MAXCOLDIF. This determination of the maximum MAXCOLDIF of the three color difference signals followed by a single division of the luminance signal control range Ymax-Y by each respective one of the three color difference signals followed by a determination of the minimum of the three quotients is described in the appendix of BBC report BBC RD 1987/22. K is limited to values of between 0 and 1 by a limiter circuit 9. Its result is applied as a multiplication factor to a multiplier circuit 11 having three multiplier sections to which the three color difference signals R-Y, G-Y, B-Y are applied for obtaining three color difference signals DR, DG and DB which, if necessary, are limited in saturation.

The following holds for these signals DR, DG, DB. If the quotient K is larger than 1 (prior to being limited), there is still enough control range in the color signals R, G, B. The color difference signals R-Y, G-Y, B-Y are then multiplied by 1 in the multiplier circuit 11 and it holds that DR=R-Y, DG=G-Y, DB=B-Y. If the quotient K is between 0 and 1, the color difference signals should be multiplied by K so as to prevent maximum allowable values from being exceeded. If the quotient K is smaller than 0 (prior to being limited), then Y>Ymax; in that case the color difference signals are multiplied by 0.

The luminance signal Y (or the knee circuit output signal Y') and the three color difference signals DR, DG and DB, which are limited in saturation, if necessary, are applied to a matrix circuit 13 for obtaining three color signals R', G' and B' limited in saturation, if necessary, in accordance with the formulas R'=Y+DR, G'=Y+DG and B'=Y+DB. It will be evident that one of the signals DR, DG, DB, hence also one of the multiplier sections of the multiplier circuit 11 is redundant; when it is omitted, however, the matrix circuit 13 will become more complex.

In accordance with a second aspect of the invention, an adaptive non-linear signal compression circuit is provided, circuit can yield a large luminance signal without color degeneration. This is obtained by reducing the color saturation in a controlled manner, which can be realized very easily by incorporating the knee circuit 2 in the luminance signal path of a video signal processing circuit of the type described hereinbefore. This knee circuit may be of a known type, while, according to the invention it is unimportant whether the knee circuit 2 is adaptive. The knee circuit may have one or more knee points, or some curved shape. An implementation with two knee points appears to yield satisfactory results. The addition of a non-linear signal transfer in the luminance signal path allows for contrast adaptation in the image while the color tint is preserved, which broadens the field of application from a simple YUV limiting of too large values to a far more sophisticated YUV signal/compression.

Figure 2:
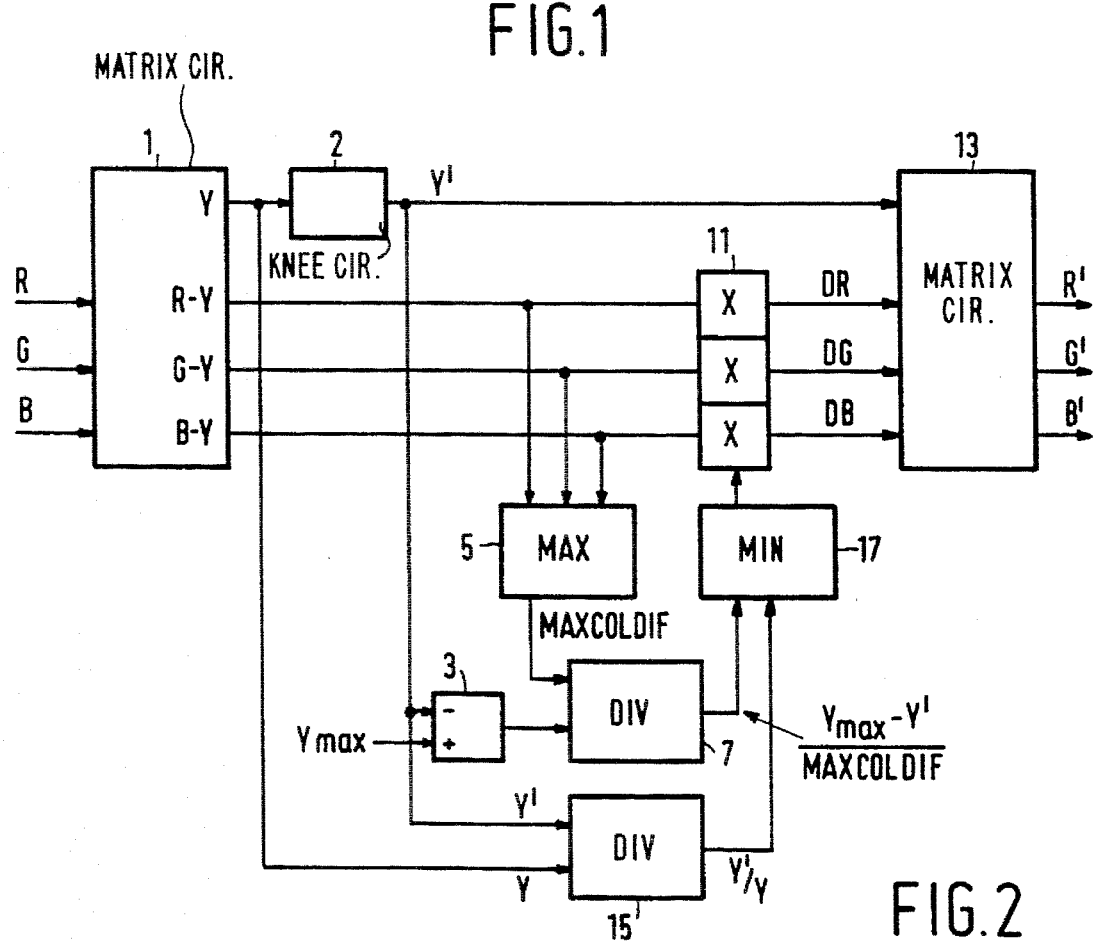
FIG. 2 shows a second embodiment of a video signal processing circuit according to the invention.

FIG. 2 shows an improved embodiment of a video signal processing circuit provided with a knee circuit. In the video signal processing circuit with the knee circuit 2 shown in FIG. 1, the color saturation may increase when the luminance signal Y is compressed in the knee circuit 2 and the color difference signals are insufficiently reduced in the multiplier circuit 11. For this reason, the video signal processing circuit according to FIG. 2 includes an extra branch which ensures that the saturation will not become too large when the knee circuit 2 compresses the luminance signal Y. To this end, a divider 15 receives the uncompressed luminance signal Y and the compressed luminance signal Y' supplied by the knee circuit 2, and supplies its quotient Y'/Y. A minimum circuit 17 determines the minimum value of the output signals of the dividers 7 and 15, this minimum value controlling the multiplier circuit 11.

When the minimum circuit 17 supplies the quotient Y'/Y, the color difference signals are multiplied by Y'/Y, so that the color saturation can no longer increase when the luminance signal Y is compressed.

FIG. 3 shows a further embodiment of a video signal processing circuit provided with a knee circuit. In this embodiment, the matrix circuit 1A only supplies the luminance signal Y and the color difference signals R-Y and B-Y and the matrix circuit 13 only receives the compressed luminance signal Y' and the color difference signals DR and DB; the "green" color difference signal branch is thus dispensed with. Also in this connection, the maximum MAXCOLDIF is obtained from the maximum RGB-MAX, obtained by a maximum circuit 5A, of the three color signals R, G and B, from which maximum RGB-MAX, the luminance signal Y is subtracted by a subtracter circuit 5B. A change-over switch 19 enables the choice of either the maximum RGB-MAX of the three color signals R, G and B, or the luminance signal Y as a basis for the compression. If this choice has already been made by the manufacturer of the video signal processing circuit, the manufacture can directly connect the connections associated with his choice so that the change-over switch 19 need not be provided. The uncompressed signal X supplied by the change-over switch 19 is applied to the knee circuit 2 which supplies a compressed signal X'. The divider 15 determines the quotient X'/X of the compressed signal X' and the uncompressed signal X. The compressed luminance signal Y' is obtained by multiplying the quotient X'/X in a multiplier circuit 2A by the luminance signal Y. By means of the minimum value of the signals supplied by the dividers 7 and 15, the minimum circuit 17 controls the multipliers 11A and 11B with which the saturation of the color difference signals R-Y and B-Y is limited. The factor X'/X ensures that the saturation in the compressed part of the signal remains constant as long as the saturation is not further reduced by a possibly smaller factor (Ymax-Y)/MAXCOLDIF.

It is to be noted that the embodiments described hereinbefore elucidate instead of limit the invention and that those skilled in the art will be able to design many alternative embodiments without departing from the scope of the appendant claims. The maximally allowed luminance signal value Ymax will generally be 102% of the nominally maximum luminance signal value, so that the circuit does not become active when the values are exceeded to a small extent.

The matrix circuit 13 (13A) can be omitted if further video signal processing circuits (not shown) are adapted to process the luminance signal Y or Y' and the color difference signals DR (=U) and DG (=V) instead of the color signals R', G', B'. It is alternatively possible to apply luminance and color difference signals Y, U, V instead of the color signals R, G, B to the video signal processing circuits shown in FIGS. 1 and 2. Also, if there are physically no color signals R, G, B anywhere in the signal compression circuit, the aim of the invention is to provide an adaptive signal compression by correcting the color saturation, in which the color signal values R, G, B remain below their respective maximally allowed values without affecting the luminance and the tint by correcting the color saturation, because luminance and color difference signals Y, U, V will eventually always be displayed on a display screen by means of color signals R, G, B.

The manner, shown in FIG. 3, in which the maximum MAXCOLDIF of the three color difference signals R-Y, G-Y, B-Y can be obtained from the maximum RGB-MAX of the three color signals R, G, B may also be used in the circuits of FIGS. 1 and 2. Whenever the claims refer to the maximum MAXCOLDIF of the three color difference signals R-Y, G-Y, B-Y, it should therefore be borne in mind that this maximum MAXCOLDIF need not necessarily have been obtained from these three color difference signals and that it is consequently not necessary that all of these three color difference signals are to be found in the circuit, see, for example, the embodiment of the invention shown in FIG. 3. As is further shown in FIG. 3, the matrix circuit 1 is to supply only two color difference signals if the maximum MAXCOLDIF of the three color difference signals R-Y, G-Y, B-Y is obtained from the maximum RGB-MAX of the three color signals R, G, B and if, moreover, the multiplier circuit 11 as described hereinbefore comprises only two multiplier sections.

The video signal processing circuit described hereinbefore may be used in a simple and advantageous manner in a television camera in which the color signals R, G, B obtained from an image pick-up device are applied to one of the adaptive signal compression circuits shown in FIGS. 1–3.

The invention can be implemented by means of hardware comprising several distinct elements, or by means of a suitably programmed computer.

I claim:

1. A video signal processing circuit for realizing an adaptive signal compression, comprising:
    first means for supplying color difference signals and a luminance signals from applied color signals; and
    color saturation control means, coupled to said first means, for limiting at least one color signal exceeding a corresponding maximum value by multiplying the color difference signals by a same correction factor, wherein the color saturation control means comprises:
    means for obtaining a maximum value of three color difference signals;
    means for determining a difference between a maximally allowed luminance signal value and a value of said luminance signal; and
    means for obtaining the correction factor in dependence on the difference between the maximally allowed luminance signal value and the luminance signal value, and the maximum value of the three color difference signals.

2. A video signal processing circuit as claimed in claim 1, wherein said means for obtaining the maximum value of the three color difference signals comprises:
    means for obtaining a maximum value of the color signals; and
    means for subtracting the luminance signal value from the maximum value of the color signals.

3. A video signal processing circuit as claimed in claim 1, wherein the means for obtaining the correction factor in dependence on the difference between a maximally allowed luminance signal value and the luminance signal value, and the maximum value of the three color difference signals, comprises:
    a divider for obtaining a quotient of an output signal of the subtracter circuit and the maximum value of the three color difference signals;
    means for obtaining said correction factor from the quotient; and
    wherein the color saturation control means further comprise a multiplier circuit for multiplying the color difference signals by said correction factor.

4. A video signal processing circuit as claimed in claim 1, wherein said video signal processing circuit further comprises a non-linear compression circuit for compressing the luminance signal and for applying a compressed luminance signal value to the difference determining means.

5. A video signal processing circuit as claimed in claim 4, wherein the non-linear compression circuit comprises:
    means for obtaining a compressed signal from an uncompressed signal, in which the uncompressed signal is a luminance signal or the maximum value of the color signals; and
    means for obtaining and applying to said correction factor obtaining means, the quotient of the compressed signal and the uncompressed signal, in which the correction factor also depends on said quotient.

6. A video signal processing circuit as claimed in claim 5, wherein the non-linear compression circuit further comprises means for multiplying the luminance signal by said quotient for obtaining the compressed luminance signal.

7. A method of processing a video signal for realizing an adaptive signal compression, comprising the steps:
    supplying color difference signals and a luminance signal from color signals; and
    limiting at least one of said color signals exceeding a corresponding maximum value by multiplying the color difference signals by a same correction factor, wherein the limiting step comprises the further steps:
    obtaining a maximum value of three color difference signals;
    determining a difference between a maximally allowed luminance signal value and a value of said luminance signal; and
    obtaining the correction factor in dependence on the difference between the maximally allowed luminance signal value and the luminance signal value, and the maximum value of the three color difference signals.

8. A camera comprising an image pick-up device for supplying color signals, and a video signal processing circuit coupled to the image pick-up device for realizing an adaptive signal compression, the video signal processing circuit comprising:
    first means for supplying color difference signals and a luminance signal, and color saturation control means coupled to said first means for limiting at least one of said color signals exceeding its respective maximum value by multiplying the color difference signals by a same correction factor, wherein the color saturation control means comprises:
    means for obtaining a maximum value of three color difference signals;
    means for determining a difference between a maximally allowed luminance signal value and a value of said luminance signal; and means for obtaining the correction factor in dependence on the difference between the maximally allowed luminance signal value and the luminance signal value, and the maximum value of the three color difference signals.

9. An adaptive color signal compression circuit, comprising:

first means for supplying color difference signals and a luminance signal from color signals;

second means for linearly transferring said luminance signal to obtain a linearly transferred luminance signal;

color signal compression means coupled to said first means for limiting at least one of said color signals exceeding a corresponding maximum value by multiplying the color difference signals by a same correction factor, to control saturation without affecting luminance or tint, to obtain saturation controlled color difference signals; and third means for receiving said linearly transferred luminance signal and said saturation controlled color difference signals and for supplying adaptively compressed color signals.

10. An adaptive color signal compression circuit as claimed in claim 9, wherein the color signal compression means comprises:

means for obtaining a maximum value of three color difference signals;

means for determining a difference between a maximally allowed luminance signal value and a luminance signal value; and means for obtaining the correction factor in dependence on the difference between the maximally allowed luminance signal value and the luminance signal value, and the maximum value of the three color difference signals.

11. An adaptive color signal compression circuit as claimed in claim 10, wherein said means for obtaining the maximum value of the three color difference signals comprises:

means for obtaining a maximum value of the color signals; and means for subtracting the luminance signal value from the maximum value of the color signals.

12. An adaptive color signal compression circuit as claimed in claim 10, wherein the means for obtaining the correction factor in dependence on the difference between a maximally allowed luminance signal value and the luminance signal value, and the maximum value of the three color difference signals, comprises:

a divider for obtaining a quotient of an output signal of the subtracter circuit and the maximum value of the three color difference signal;

means for obtaining said correction factor from the quotient; and wherein the color saturation control means further comprises a multiplier circuit for multiplying the color difference signals by said correction factor.

13. An adaptive color signal compression method comprising the steps:

supplying color difference signals and a luminance signal from color signals;

linearly transferring said luminance signal to obtain a linearly transferred luminance signal;

limiting at least one of said color signals exceeding a corresponding maximum value by multiplying the color difference signals by a same correction factor, to control saturation without affecting luminance or tint, to obtain saturation controlled color difference signals; and receiving said linearly transferred luminance signal and said saturation controlled color difference signals and supplying adaptively compressed color signals.

14. A camera comprising an image pick-up device for supplying color signals, and an adaptive color signal compression circuit coupled to the image pick-up device, the adaptive color signal compression circuit comprising:

first means for supplying color difference signals and a luminance signal from said color signals;

second means for linearly transferring said luminance signal to obtain a linearly transferred luminance signal;

color signal compression means coupled to said first means for limiting at least one of said color signals exceeding a corresponding maximum value by multiplying the color difference signals by a same correction factor, to control saturation without affecting luminance or tint, to obtain saturation controlled color difference signals; and third means for receiving said linearly transferred luminance signal and said saturation controlled color difference signals to supply adaptively compressed color signals.

* * * * *